United States Patent
Ikeuchi et al.

(10) Patent No.: US 10,514,289 B2
(45) Date of Patent: Dec. 24, 2019

(54) MASS FLOW RATE MEASUREMENT METHOD, THERMAL MASS FLOW METER USING SAID METHOD, AND THERMAL MASS FLOW CONTROLLER USING SAID THERMAL MASS FLOW METER

(71) Applicant: Hitachi Metals, Ltd., Minato-ku, Tokyo (JP)

(72) Inventors: Shintaro Ikeuchi, Mie (JP); Hiroyuki Ito, Mie (JP)

(73) Assignee: Hitachi Metals, Ltd., Tokyo (JP)

( * ) Notice: Subject to any disclaimer, the term of this patent is extended or adjusted under 35 U.S.C. 154(b) by 423 days.

(21) Appl. No.: 15/300,615

(22) PCT Filed: Feb. 23, 2015

(86) PCT No.: PCT/JP2015/055026
§ 371 (c)(1),
(2) Date: Sep. 29, 2016

(87) PCT Pub. No.: WO2015/151647
PCT Pub. Date: Oct. 8, 2015

(65) Prior Publication Data
US 2017/0115150 A1 Apr. 27, 2017

(30) Foreign Application Priority Data
Mar. 31, 2014 (JP) ................................ 2014-072037

(51) Int. Cl.
*G01F 15/04* (2006.01)
*G01F 5/00* (2006.01)
(Continued)

(52) U.S. Cl.
CPC ............ *G01F 15/046* (2013.01); *G01F 1/684* (2013.01); *G01F 1/6842* (2013.01); *G01F 5/00* (2013.01); *G05D 7/0635* (2013.01)

(58) Field of Classification Search
CPC .................. G01N 2030/324; G01N 30/32; G01F 15/046; G01F 1/684; G01F 1/6842; G01F 5/00; G05D 7/0635
See application file for complete search history.

(56) References Cited

U.S. PATENT DOCUMENTS 5,545,252 A * 8/1996 Hinshaw ................ G01N 30/32
73/23.25
2012/0310579 A1* 12/2012 Yan ........................ G01N 9/002
702/100

FOREIGN PATENT DOCUMENTS

CN 102812344 A 12/2012
JP 03204705 A 9/1991
(Continued)

OTHER PUBLICATIONS

Japan Patent Office, "International Search Report and Written Opinion re Application No. PCT/JP2015/055026", dated Apr. 3, 2015, p. 8, Published in: JP.

*Primary Examiner* — Kyle R Quigley
(74) *Attorney, Agent, or Firm* — Neugeboren O'Dowd PC (57) ABSTRACT

In a capillary heating type thermal type mass flow meter comprising a sensor configured to detect temperature and pressure of a fluid and a correction means configured to correct a mass flow rate based on said temperature and said pressure, change rates of the mass flow rate of the fluid with respect to temperature and pressure have been previously acquired, and the mass flow rate is corrected based on said temperature and said pressure as well as these change rates. Thereby, the mass flow rate can be measured accurately and simply even when the temperature and/or pressure of the fluid, whose mass flow rate is to be measured, change.

3 Claims, 2 Drawing Sheets (51) Int. Cl.
    *G05D 7/06*       (2006.01)
    *G01F 1/684*     (2006.01)

(56) References Cited

FOREIGN PATENT DOCUMENTS

| JP | 2004093174 A | 3/2004 |
| JP | 2009087126 A | 4/2009 |
| JP | 2009192220 A | 8/2009 |
| JP | 2010091320 A | 4/2010 |
| JP | 2010169657 A | 8/2010 |

\* cited by examiner

MASS FLOW RATE MEASUREMENT METHOD, THERMAL MASS FLOW METER USING SAID METHOD, AND THERMAL MASS FLOW CONTROLLER USING SAID THERMAL MASS FLOW METER

BACKGROUND

Field

The present invention relates to a method for measuring a mass flow rate in a thermal type mass flow meter, a thermal type mass flow meter which uses the method, and a thermal type mass flow controller which uses the thermal type mass flow meter.

Background

A mass flow meter is widely used for the purpose of measuring a mass flow rate of a process gas supplied in a chamber in a manufacturing process of a semiconductor, for example. In addition, a mass flow meter not only is used independently as mentioned above, but also is used as a part which constitutes a mass flow control device (mass flow controller) in combination with other parts, such as a flow control valve and a control circuit. Although there are various types of mass flow meters in the art, a thermal type mass flow meter is widely used since it can accurately measure a mass flow rate of a fluid (for example, a gas and a liquid) with a comparatively simple configuration. Among thermal type mass flow meters, especially, a capillary heating type thermal type mass flow meter is used widely.

Generally, a capillary heating type thermal type mass flow meter is constituted by a passage through which a fluid flows, a bypass (may be referred to as a "flow element" or a "laminar-flow element") prepared in the middle of the passage, a sensor tube (may be referred to as a "capillary" or a "capillary tube") which branches from the passage on an upstream side of the bypass and joins the passage again in a downstream side of the bypass, a pair of sensor wires which is wound around the sensor tube and a sensor circuit which comprises a bridge circuit containing the sensor wires and other resistive elements (see for example, Japanese Patent Application Laid-Open "kokai" No. 2009-192220 official report). The bypass is configured so that it has a flow resistance against a fluid and a fixed proportion of a fluid which flows through the passage branches to the sensor tube.

In the above-mentioned configuration, when the pair of sensor wires is made to generate heat by applying a predetermined electric voltage (or a predetermined electric current), heat generated from the sensor wires is removed (drawn) by a fluid which flows through the sensor tube. As a result, the fluid which flows through the sensor tube is heated. In this case, the sensor wire on the upstream side has its heat removed by the fluid which is not yet heated. On the other hand, the sensor wire on the downstream side has its heat removed by the fluid which has been already heated with the sensor wire on the upstream side. For this reason, the heat removed from the sensor wire on the upstream side is larger than the heat removed from the sensor wire on the downstream side. As a result, temperature of the sensor wire on the upstream side becomes lower than temperature of the sensor wire on the downstream side. For this reason, an electrical resistance value of the sensor wire on the upstream side becomes lower than an electrical resistance value of the sensor wire on the downstream side. A difference between the electrical resistance values resulting from thus produced temperature difference between the sensor wire on the upstream side and the sensor wire on the downstream side becomes larger, as a mass flow rate of the fluid which flows through the sensor tube becomes larger.

A change of the difference in the electrical resistance value between the sensor wire on the upstream side and the sensor wire on the downstream side according to a mass flow rate of the fluid as mentioned above can be detected as a change of a potential difference by using a bridge circuit, etc., for example. Furthermore, this potential difference can be detected, for example, as an output signal outputted as a voltage value or a current value through an operational amplifier, etc. Based on the output signal thus detected, a mass flow rate of the fluid which flows through the sensor tube can be obtained, and a mass flow rate of the fluid which flows through the passage can be obtained based on the mass flow rate of the fluid which flows through the sensor tube (will be mentioned later in detail).

For example, in a thermal type mass flow meter which has a configuration as mentioned above, a certain specific fluid (for example, nitrogen gas ($N_2$)) is flowed at a certain mass flow rate, used as a reference, (for example, a maximal flow rate (full scale) of the thermal type mass flow meter), and a reference signal intensity which is an intensity (a voltage value or a current value) of the above-mentioned output signal at this time is measured previously. Then, when a mass flow rate of the above-mentioned specific fluid is measured by the thermal type mass flow meter, an actual measured signal intensity which is an intensity of the above-mentioned output signal at this time of actual measurement is measured, and a mass flow rate of the above-mentioned specific fluid is calculated based on a proportion of this actual measured signal intensity to the above-mentioned reference signal intensity.

However, in fact, when measuring a mass flow rate of a fluid which has different thermal physical properties (for example, heat capacity, etc.) from the above-mentioned specific fluid, it is difficult to accurately calculate a mass flow rate based on the proportion of an actual measured signal intensity to the reference signal intensity as mentioned above. Therefore, in the art, it is known to accurately calculate a mass flow rate of a fluid which has different thermal physical propertied from the above-mentioned specific fluid by correcting a mass flow rate with a conversion coefficient which is referred to as a conversion factor (CF), for example.

However, in fact, a mass flow rate of a fluid may be measured at different temperature and/or pressure from a condition under which the reference signal intensity is measured. In the case of an ideal gas, its thermal physical property is constant even at different temperature and/or pressure from a condition under which the reference signal intensity is measured. Moreover, also as for fluids which show behavior close to that of an ideal gas, such as noble gases (rare gases) (Ar, etc.) and nitrogen gas ($N_2$), for example, since their thermal physical properties are approximately constant, it is substantially possible to accurately calculate a mass flow rate thereof based on the proportion of an actual measured signal intensity to the reference signal intensity as mentioned above.

However, many fluids show different behavior from that of an ideal gas. Specifically, thermal physical property of many fluids changes with temperature and/or pressure. Therefore, in order to accurately measure a mass flow rate of such a fluid, it is necessary to calculate a mass flow rate in consideration of not only its thermal physical property, but also a dependency of its thermal physical property on temperature and/or pressure. Therefore, in the art, various approaches for accurately measuring a mass flow rate of a fluid showing a different behavior from that of an ideal gas by taking into consideration a kind, temperature and pressure of the fluid whose mass flow rate is to be measured has been proposed.

For example, a technology for calculating an accurate mass flow rate using a value which is obtained by correcting a known physical property value (heat capacity) of a gas whose mass flow rate is to be measured according to temperature of the gas has been proposed (see for example, Japanese Patent Application Laid-Open "kokai" No. H03-204705 official report). Moreover, a technology for calculating an accurate mass flow rate using values which are obtained by correcting gas coefficients predetermined for every kinds and set flow rates of a gas whose mass flow rate is to be measured according to pressure of the gas has been proposed (see for example, Japanese Patent Application Laid-Open "kokai" No. 2010-091320 official report and Japanese Patent Application Laid-Open "kokai" No. 2010-169657 official report). Furthermore, a technology for calculating an accurate mass flow rate using correction coefficients predetermined for every kinds, temperatures and pressures of the gas whose mass flow rate is to be measured has been proposed (see for example, Japanese Patent Application Laid-Open "kokai" No. 2009-087126 official report).

In accordance with these technologies, in consideration of not only a kind of a gas whose mass flow rate is to be measured, but also temperature and/or pressure of the gas when measuring the mass flow rate, mass flow rates of various gases can be measured more accurately.

SUMMARY

As a result of wholehearted investigation, the present inventor has found that, in a capillary heating type thermal type mass flow meter which comprises a sensor configured to detect temperature and pressure of a fluid and a correction means configured to correct a mass flow rate based on the above-mentioned temperature and pressure, by previously acquiring change rates of a mass flow rate with respect to temperature and pressure of the fluid and correcting a mass flow rate based on the above-mentioned temperature and pressure as well as these change rates, the mass flow rate of the fluid can be measured accurately and simply.

Namely, a method for measuring a mass flow rate of a fluid according to the present invention is, a method for measuring a mass flow rate (mass flow rate measurement method) in which, in a capillary heating type thermal type mass flow meter (capillary heating type thermal mass flow meter) comprising a flow sensor configured to output an output signal corresponding to a mass flow rate of a fluid, an actual measured mass flow rate $F_m$ of said fluid is calculated based on an actual measured signal intensity S which is an intensity of said output signal, wherein:

said mass flow meter comprises;

a temperature sensor configured to detect temperature T of said fluid, a pressure sensor configured to detect pressure P of said fluid, and a correction means configured to calculate a corrected mass flow rate $F_c$ by correcting said actual measured mass flow rate $F_m$ based on said temperature T and said pressure P, a data storage device, which said correction means comprises, is configured to previously store;

a temperature coefficient $\alpha$ which is a partial differential coefficient of said actual measured mass flow rate $F_m$ of said fluid with respect to temperature, and a pressure coefficient $\beta$ which is a partial differential coefficient of said actual measured mass flow rate $F_m$ of said fluid with respect to pressure, and said correction means is configured to calculate said corrected mass flow rate $F_c$ by correcting said actual measured mass flow rate $F_m$ according to the following formula (4), based on a temperature deviation $\Delta T$ which is a deviation between temperature $T_0$ at the time of calibration of the mass flow meter and said temperature T, a pressure deviation $\Delta P$ which is a deviation between pressure $P_0$ at the time of calibration of the mass flow meter and said pressure P, said temperature coefficient $\alpha$ and said pressure coefficient $\beta$.

$$F_c = F_m(1 + \alpha \times \Delta T + \beta \times \Delta P) \tag{4}$$

In accordance with the method for measuring a mass flow rate according to the present invention, even when temperature and/or pressure of a fluid whose mass flow rate is to be measured changes, a mass flow rate can be measured accurately and simply.

DETAILED DESCRIPTION

As mentioned above, various technologies with which, in consideration of not only a kind of a gas whose mass flow rate is to be measured, but also temperature and/or pressure of the gas when measuring the mass flow rate, mass flow rates of various gases can be measured more accurately, has been proposed in the art.

However, there is some points left to be further improved in these conventional technologies. First, as for the invention described in Japanese Patent Application Laid-Open "kokai" No. H03-204705 official report, a correction coefficient calculated for a mass flow meter itself used for a measuring a mass flow rate is not used, but a known physical property value of a gas whose mass flow rate is to be measured is used. Therefore, it may be difficult to correct a mass flow rate measured by the mass flow meter with sufficiently high accuracy. Moreover, since the above-mentioned physical property value is corrected only according to temperature, influence by pressure cannot be corrected.

As for the inventions described in Japanese Patent Application Laid-Open "kokai" No. 2010-091320 official report and Japanese Patent Application Laid-Open "kokai" No. 2010-169657 official report, it is necessary to previously define a gas coefficient for every kinds and set flow rates of gases whose mass flow rates are to be measured, and large data storage capacity for storing a huge number of gas coefficients is needed. Moreover, since the above-mentioned gas coefficient is corrected only according to pressure, influence by temperature cannot be corrected. As for the invention described in the Patent Document 5, it is necessary to previously define a correction coefficient for every combinations of types, temperatures and pressures of gases whose mass flow rates are to be measured, and large data storage capacity for storing a huge number of correction coefficients is also needed.

As mentioned above, in the art, a method, by which a mass flow rate of a fluid can be measured accurately and simply even when temperature and/or pressure of a fluid whose mass flow rate is to be measured changes, is demanded. Therefore, one of objectives of the present invention is to provide a method, by which a mass flow rate of a fluid can be measured accurately and simply even when temperature and/or pressure of a fluid whose mass flow rate is to be measured changes.

As mentioned above, a method, by which a mass flow rate of a fluid can be measured accurately and simply even when temperature and/or pressure of a fluid whose mass flow rate is to be measured changes, is demanded. Then, as a result of wholehearted investigation, the present inventor has found that, in a capillary heating type thermal type mass flow meter which comprises a sensor configured to detect temperature and pressure of a fluid and a correction means configured to correct a mass flow rate based on the above-mentioned temperature and pressure, by previously acquiring change rates of a mass flow rate with respect to temperature and pressure of the fluid and correcting a mass flow rate based on the above-mentioned temperature and pressure as well as these change rates, the mass flow rate of the fluid can be measured more accurately, and has conceived the present invention.

Specifically, in methods for measuring a mass flow rate according to conventional technologies, only influence by either of temperature or pressure of a fluid whose mass flow rate is to be measured is taken into consideration, or a correction coefficient is previously defined for each of huge number of combinations of kinds, temperatures and pressures of fluids. On the contrary to this, in a method for measuring a mass flow rate according to the present invention, change rates of a mass flow rate with respect to temperature and pressure (a temperature coefficient and a pressure coefficient) of a fluid whose mass flow rate is to be measured are previously acquired, and a mass flow rate is calculated according to a formula which uses deviations of temperature and pressure between the times of measurement and calibration, the temperature coefficient and the pressure coefficient.

Namely, the first embodiment of the present invention is, a method for measuring a mass flow rate (mass flow rate measurement method) in which, in a capillary heating type thermal type mass flow meter (capillary heating type thermal mass flow meter) comprising a flow sensor configured to output an output signal corresponding to a mass flow rate of a fluid, an actual measured mass flow rate $F_m$ of said fluid is calculated based on an actual measured signal intensity S which is an intensity of said output signal, wherein:
said mass flow meter comprises;
a temperature sensor configured to detect temperature T of said fluid,
a pressure sensor configured to detect pressure P of said fluid, and
a correction means configured to calculate a corrected mass flow rate $F_c$ by correcting said actual measured mass flow rate $F_m$ based on said temperature T and said pressure P,
a data storage device, which said correction means comprises, is configured to previously store;
a temperature coefficient α which is a partial differential coefficient of said actual measured mass flow rate $F_m$ of said fluid with respect to temperature, and
a pressure coefficient β which is a partial differential coefficient of said actual measured mass flow rate $F_m$ of said fluid with respect to pressure, and
said correction means is configured to calculate said corrected mass flow rate $F_c$ by correcting said actual measured mass flow rate $F_m$ according to the following formula (4), based on a temperature deviation ΔT which is a deviation between temperature $T_0$ at the time of calibration of the mass flow meter and said temperature T, a pressure deviation ΔP which is a deviation between pressure $P_0$ at the time of calibration of the mass flow meter and said pressure P, said temperature coefficient α and said pressure coefficient β.

$$F_c = F_m(1 + \alpha \times \Delta T + \beta \times \Delta P) \qquad (4),$$

As mentioned above, a mass flow meter, to which the method for measuring a mass flow rate according to the present embodiment is applied, is a common capillary heating type thermal type mass flow meter which has a configuration well-known in the art. Specifically, the method for measuring a mass flow rate according to the present embodiment can be applied to a thermal type mass flow meter which has a configuration as follows.

A capillary heating type thermal type mass flow meter (capillary heating type thermal mass flow meter) comprising:
a passage through which a fluid flows,
a bypass prepared in the middle of said passage,
a flow sensor including a sensor tube which branches from said passage on an upstream side of said bypass and joins said passage again in a downstream side of said bypass and a pair of sensor wires which is disposed so as to be able to conduct heat to a fluid flowing through said sensor tube,
a power supply configured to supply an input signal for generating heat from said sensor wires to said sensor wires, and
a sensor circuit comprising a bridge circuit containing said sensor wires.

Figure 1:
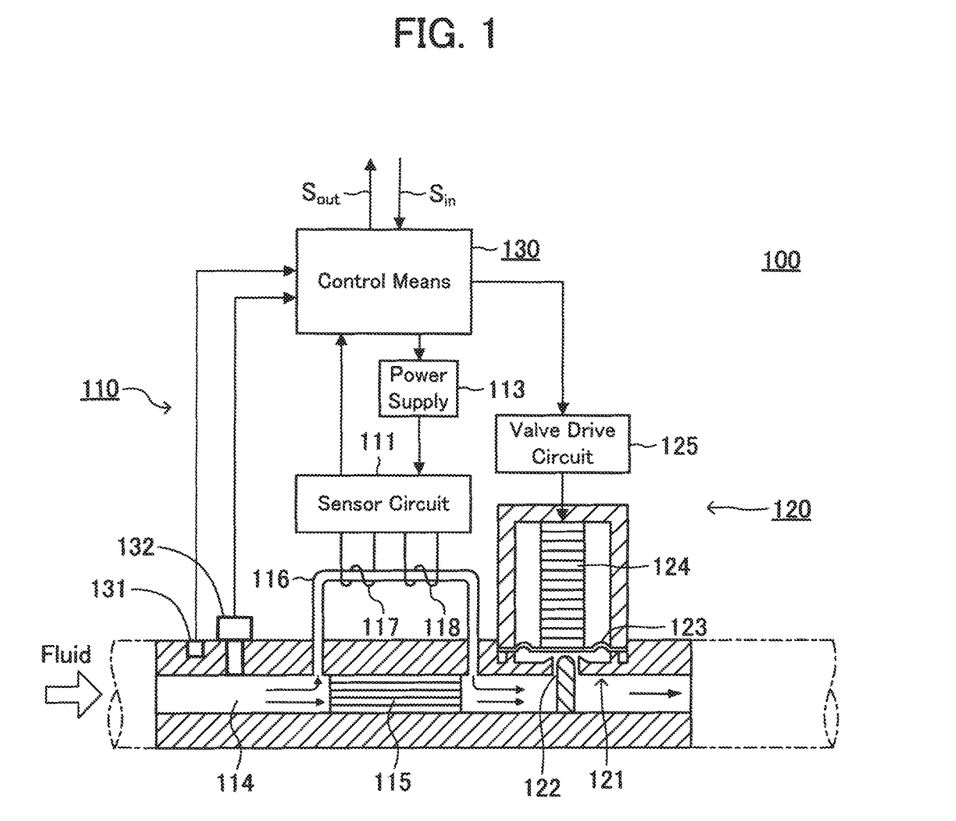
FIG. 1 is a schematic diagram for showing an example of a configuration of a thermal type mass flow controller including a thermal type mass flow meter, to which a method for measuring a mass flow rate according to one embodiment of the present invention is applied.
Figure 2:
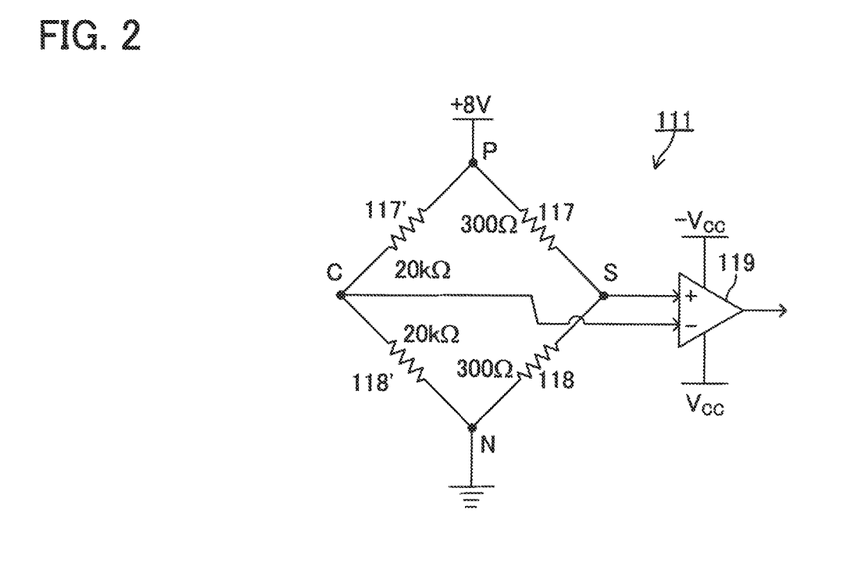
FIG. 2 is a schematic diagram for showing an example of a configuration of a sensor circuit which a thermal type mass flow meter, to which a method for measuring a mass flow rate according to one embodiment of the present invention is applied, comprises.

Here, an example of a configuration of a thermal type mass flow meter, to which a method for measuring a mass flow rate according to the present embodiment is applied, will be explained in detail below, referring to accompanying drawings. FIG. 1 is a schematic diagram for showing an example of a configuration of a thermal type mass flow controller including a thermal type mass flow meter, to which a method for measuring a mass flow rate according to one embodiment of the present invention is applied, as mentioned above. Furthermore, FIG. 2 is a schematic diagram for showing an example of a configuration of a sensor circuit which a thermal type mass flow meter, to which a method for measuring a mass flow rate according to one embodiment of the present invention is applied, comprises, as mentioned above.

As shown in FIG. 1, a thermal type mass flow controller 100 includes a thermal type mass flow meter 110, a flow rate adjustment means 120, and a control means 130 (corresponding to a "correction means" and a "control means" that will be mentioned later). The thermal type mass flow meter 110 is constituted by a passage 114 through which a fluid flows, a bypass 115 prepared in the middle of the passage 114, a sensor tube 116 which branches from the passage 114 on an upstream side of the bypass 115 and joins the passage 114 again on a downstream side of the bypass 115, a pair of sensor wires 117 and 118 which is wound around the sensor tube 116, and a sensor circuit 111 which comprises a bridge circuit containing the sensor wires 117 and 118 and other resistive elements 117' and 118' as shown in FIG. 2. The bypass 115 has a flow resistance against a fluid and a fixed proportion of a fluid which flows through the passage 114 branches to the sensor tube 116. In the configuration shown in FIG. 1, a pair of sensor wires 117 and 118 is wound around the sensor tube 116. However, as long as heat generated from sensor wires can be conducted to a fluid which flows through the sensor tube, a specific placement of sensor wires is not limited in particular.

In the above-mentioned configuration, Joule's heat is generated when a predetermined input signal (electrical signal) is supplied (inputted) to the sensor wires 117 and 118 from a power supply 113, and this heat is removed by a fluid which flows through the sensor tube 116. In this case, the sensor wire 117 on the upstream side has its heat removed by the fluid which is not yet heated, while the sensor wire 118 on the downstream side has its heat removed by the fluid which has been already heated with the sensor wire 117 on the upstream side. For this reason, temperature of the sensor wire 118 on the downstream side becomes higher than temperature of the sensor wire 117 on the upstream side. As a result, electrical resistance of the sensor wire 118 on the downstream side becomes higher than electrical resistance of the sensor wire 117 on the upstream side. An input signal (electrical signal) supplied (inputted) to sensor wires for the purpose of heat generation may be controlled based on either of an electric voltage and an electric current.

The difference (ratio) between the electrical resistance values thus resulting from temperature difference between the sensor wire 117 on the upstream side and the sensor wire 118 on the downstream side changes according to a mass flow rate of the fluid which flows through the sensor tube 116. As a result, potential difference between a point S and a point C of the sensor circuit 111 also changes according to the mass flow rate of the fluid which flows through the sensor tube 116. A mass flow rate of the fluid which flows through the sensor tube 116 can be measured by detecting such a change of the potential difference, for example, through an operational amplifier 119. Furthermore, based on the mass flow rate of the fluid which flows through the sensor tube 116 thus measured, a mass flow rate of the fluid which flows through the passage 114 can be calculated.

In the sensor circuit shown in FIG. 2, the sensor wires 117 and 118, which have a resistance value of 300Ω respectively, are connected in series at the point S, and the other resistive elements 117' and 118', which have a resistance value of 20 kΩ respectively, are connected in series at the point C. Furthermore, the both ends of the sensor wires 117 and 118 and both ends of the other resistive elements 117' and 118', which are respectively connected in series as mentioned above, are connected at a point P and a point N, respectively. Namely, the sensor wires 117 and 118 and the resistive elements 117' and 118' constitute what is called a "Wheatstone bridge."

At the time of measuring a mass flow rate, a predetermined input signal (electrical signal) is supplied (inputted) between the above-mentioned point P and point N from the power supply 113, and a Joule's heat is generated from the sensor wires 117 and 118. Furthermore, the point S and the point C are connected respectively to a non-inverting input (+) and an inverting input (−) of the operational amplifier 119, and a signal according to potential difference between the point S and the point C is acquired as an output signal from the operational amplifier 119. Based on an output signal thus obtained from the operational amplifier 119, a mass flow rate of a fluid which flows through the sensor tube 116 can be measured (calculated). However, when the electrical resistances of the other resistive elements 117' and 118' are affected by the influence of heat generation from the sensor wires 117 and 118, the mass flow rate of the fluid which flows through the sensor tube 116 cannot be measured accurately. Therefore, the other resistive elements 117' and 118' are disposed at a position and/or state where they are not substantially affected by the influence of heat generation from the sensor wires 117 and 118.

The above-mentioned control on a supply of the input signal to the sensor wires 117 and 118 and a detection of the output signal from the sensor circuit 111 can be performed by the control means 130 which the thermal type mass flow meter 110 comprises, for example. Such a control means 130 can be implemented as an electrical control unit, such as a microcomputer, for example. Since detail of such an electrical control unit is well-known to a person skilled in the art, explanation thereof is omitted in the present specification.

In addition, as mentioned above, FIG. 1 is a schematic diagram for showing an example of a configuration of a thermal type mass flow controller including a thermal type mass flow meter to which the method for measuring a mass flow rate according to one embodiment of the present invention is applied. Therefore, as mentioned above, in FIG. 1, the flow rate adjustment means 120, a temperature sensor 131 and a pressure sensor 132, etc., are also illustrated, besides the thermal type mass flow meter 110. Since these will be explained later in detail in explanation about embodiments as a thermal type mass flow meter and a thermal type mass flow controller according to the present invention, it is not explained here.

As a material of a sensor tube, a material which has an excellent corrosion resistance and an excellent mechanical strength is desirable, and metal (namely, conductor), such as a stainless steel, is used generally. On the other hand, as a matter of course, a conductor is used as a material of a sensor wire. Specifically, as a material of a sensor tube, a material which has an excellent corrosion resistance and an excellent mechanical strength, such as stainless-steel materials including SUS316 defined by Japanese Industrial Standards (JIS), for example, is used. On the other hand, as a material of a sensor wire, a conductor which have a desired electrical resistance value, such as an enameled wire, for example, (for example, metals, such as Cu, etc.) is used. Namely, in general, all the materials of a sensor tube and a sensor wire are conductors.

Therefore, it is general in a flow sensor that, for the purpose of prevention of electric continuity between a sensor tube and sensor wires and electric continuity between sensor wires, and fixation of sensor wires to a sensor tube, etc., a covering layer formed of an insulation material, such as resin, for example, is disposed in the surroundings of a part of the sensor tube where the sensor wires are wound and the sensor wires. In addition, in order to measure a mass flow rate by a flow sensor, as mentioned above, heat generated from sensor wires due to electrification needs to be removed by a sensor tube and a fluid which flows through the sensor tube. Therefore, it is desirable that at least a covering layer which intervenes between sensor wires and a sensor tube has good thermal conductivity.

As mentioned above, a function as an electric insulator, a function as an adhesive and a function as a heat conductor are needed for a material which constitutes the covering layer. Furthermore, a material which can be formed as a thin film on surfaces of a sensor tube and sensor wires and has sufficient flexibility so that no crack occurs even when a sensor wire with the cover layer formed on its surface is wound around a sensor tube is preferred. From such a viewpoint, as a material of a covering layer for a flow rate sensor according to a conventional technology, polyamide imide or polyimide is suitably used. Especially, polyimide is more preferable since it has very high thermal resistance.

The configuration of a thermal type mass flow meter which has been explained above is nothing more than an example, and a configuration of the thermal type mass flow meter, to which the method for measuring a mass flow rate according to the present embodiment is applied, is not limited to the configuration explained above.

As mentioned above, the method for measuring a mass flow rate according to the present embodiment is a method for measuring a mass flow rate in which, in a capillary heating type thermal type mass flow meter comprising a flow sensor configured to output an output signal corresponding to a mass flow rate of a fluid, an actual measured mass flow rate $F_m$ of said fluid is calculated based on said actual measured signal intensity S. Here, for the purpose of making it easy to understand the present invention, a method for measuring a mass flow rate according to a conventional technology in a thermal type mass flow meter will be explained in detail below.

Generally, a thermal type mass flow meter stores an intensity (for example, a voltage value and a current value, etc.) of an output signal as a reference signal intensity ($S_0$), for example, in a data storage device (for example, non-volatile memory etc.), which the thermal type mass flow meter comprises, etc. when a reference fluid (for example, a calibration gas, such as nitrogen gas ($N_2$), etc.) through the thermal type mass flow meter at a reference flow rate ($F_0$) at a predetermined temperature ($T_0$) at the time of calibration and at a predetermined pressure ($P_0$) at the time of calibration. At this time, it may be configured so that an intensity of a reference output signal corresponding to a predetermined reference flow rate $F_0$ obtained at the predetermined temperature $T_0$ at the time of calibration and the predetermined pressure $P_0$ at the time of calibration becomes a desired intensity $S_0$ by adjusting gains of an operational amplifier, etc., for example. For example, in a state where the temperature $T_0$ at the time of calibration and the pressure $P_0$ at the time of calibration are respectively set to 22° C. and 100 kPa, gain of an operational amplifier can be adjusted so that the reference signal intensity $S_0$ is obtained as a voltage of 5.000 V when nitrogen gas ($N_2$) as a reference fluid is flowed through the thermal type mass flow meter at a reference flow rate $F_0$ of 1 slm (Standard Litter per Minute).

When an intensity of an output signal is proportional to a mass flow rate of a fluid, given that the intensity of an actually measured output signal (actual measured signal intensity) when a reference fluid (nitrogen gas) is flowed through the thermal type mass flow meter at an arbitrary flow rate at the temperature $T_0$ at the time of calibration and the pressure $P_0$ at the time of calibration is S, the actual measured mass flow rate $F_m$ of the fluid (nitrogen gas which is a reference fluid) at this time is represented the following formula (1).

$$F_m = \frac{S}{S_0} \times F_0 \qquad (1)$$

Here, when a proportion of the actual measured signal intensity S to the reference signal intensity $S_0$ at the time of the above-mentioned measurement (for example, a proportion of an actual measured signal voltage S to a reference signal voltage $S_0$ (5.000 V)) (S/$S_0$) is defined as f (%), the above-mentioned formula (1) is represented by the following formula (2). It is convenient to use, instead of the actual measured signal intensity S, the value f (%) standardized by the reference signal intensity $S_0$ to process data, since generalized discussion which is not influenced by a magnitude of an absolute value of the reference flow rate $F_0$ and the reference signal intensity $S_0$ becomes possible thereby.

$$F_m = \frac{f}{100} \times F_0 \qquad (2)$$

As the above, a mass flow rate of a reference fluid when the reference fluid is flowed through the thermal type mass flow meter at the temperature $T_0$ at the time of calibration and the pressure $P_0$ at the time of calibration can be calculated from the actual measured signal intensity S at the time of the measurement. In addition, a reference fluid used for calibration of a mass flow meter is not limited to nitrogen gas ($N_2$), and any kind of fluid may be used as long as it has a stable thermal physical property in assumed ranges of temperature and pressure. Moreover, the reference flow rate ($F_0$) of the reference fluid and the reference signal intensity ($S_0$) corresponding thereto are also not limited to the above-mentioned exemplification, and they can be suitably set to any given values according to an assumed range of a mass flow rate and specification of a correction means which performs processing of an output signal, etc.

By the way, as mentioned above, in an actual use of a thermal type mass flow meter, a mass flow rate of a fluid of a different kind from a reference fluid may be measured. In order to accurately calculate a mass flow rate of a fluid which has different thermal physical properties (for example, heat capacity, etc.) from those of a reference fluid with a thermal mass flow meter, it is necessary to correct an actually measured mass flow rate according to the thermal physical properties of the fluid. Therefore, in the art, as mentioned above, it has been known to accurately calculate a mass flow rate of a fluid which has different thermal physical properties from those of a reference fluid by correcting a mass flow rate with a conversion factor (CF) which is an intrinsic correction coefficient previously acquired for every kinds of fluid. When such a technology to correct a mass flow rate with CF is applied to the above-mentioned formulae (1) and (2), the following formula (3) is obtained.

$$F_m = \frac{S}{S_0} \times F_0 \times CF = \frac{f}{100} \times F_0 \times CF \qquad (3)$$

However, in fact, a mass flow rate of a fluid may be measured at different temperature and/or pressure from a condition under which the reference signal intensity is measured. In the case of an ideal gas, its thermal physical properties are constant even at different temperature and/or pressure from a condition under which the reference signal intensity is measured. Moreover, also as for fluids which show behavior close to that of an ideal gas, such as noble gases (Ar, etc.) and nitrogen gas ($N_2$), for example, since their thermal physical properties are approximately constant, it is substantially possible to accurately calculate a mass flow rate thereof based on the proportion of an actual measured signal intensity to the reference signal intensity as mentioned above.

However, many fluids show different behavior from that of an ideal gas. Specifically, a thermal physical property (for example, heat capacity, etc.) of many fluids changes with temperature and/or pressure. Therefore, even though a fluid whose mass flow rate is to be measured is of the same kind as a reference fluid (namely, even though both have the same thermal physical property), the fluid has different thermal physical properties from those at the time of calibration when the temperature and/or pressure of the fluid is different from the temperature and/or pressure when the thermal type mass flow meter is calibrated with the reference fluid (namely, the temperature $T_0$ at the time of calibration and/or the pressure $P_0$ at the time of calibration).

Change of thermal physical properties as mentioned above affects measurement accuracy of a mass flow rate. For example, a measurement error of an actual measured mass flow rate $F_m$ due to temperature change of a fluid as mentioned above may reach about 2% per 10° C. at most, and a measurement error of an actual measured mass flow rate $F_m$ due to pressure change may reach about 1% per 100 kPa at most. Since these change factors (temperature and pressure of a fluid) act on a mass flow rate independently of each other, an error at the time of actually measuring a mass flow rate in this case may reach about 3% at most. Likelihood of such a change of thermal physical properties (dependency on temperature and/or pressure) depends on the kind of a fluid.

Therefore, in the art, as mentioned above, various approaches for accurately measuring a mass flow rate of a fluid showing a different behavior from that of an ideal gas by taking into consideration a kind, temperature and pressure of the fluid whose mass flow rate is to be measured has been proposed. However, there is some points left to be further improved in these conventional technologies, as already mentioned.

On the other hand, as mentioned at the beginning of the present specification, a mass flow meter is widely used for the purpose of measuring a mass flow rate of a process gas supplied into a chamber in a manufacturing processes of a semiconductor, for example. In a field of a semiconductor manufacturing technology, accuracy demanded in flow control of a process gas is increasingly heightened in association with complication and miniaturization a semiconductor device. Specifically, for example, whereas control accuracy demanded for a conventional mass flow controller had been ±1.0%, ±0.5% of control accuracy is demanded in these days. In order to satisfy such a demand, a technology, which reduces error of an actual measured value of a mass flow rate resulting from the change of temperature and/or pressure of a fluid which is to be a target of flow control even though the change occurs and controls the mass flow rate of the fluid based on an actual measured value which was measured with a high accuracy so as to bring the mass flow rate close to a target value, is required.

Therefore, in the method for measuring a mass flow rate according to the present embodiment, as mentioned above, a temperature coefficient α which is a partial differential coefficient of the actual measured mass flow rate $F_m$ of the fluid whose mass flow rate is to be measured with respect to temperature and a pressure coefficient β which is a partial differential coefficient of the actual measured mass flow rate $F_m$ of the fluid with respect to pressure are previously determined. Then, when actually measuring the actual measured mass flow rate $F_m$ of the fluid, a more accurate corrected mass flow rate $F_c$ is calculated by correcting the actual measured mass flow rate $F_m$ using a formula as mentioned above, based on a temperature deviation ΔT which is a deviation between temperature $T_0$ at the time of calibration of the mass flow meter and temperature T at the time of an actual measurement, a pressure deviation ΔP which is a deviation between pressure $P_0$ at the time of calibration of the mass flow meter and pressure P at the time of an actual measurement, the above-mentioned temperature coefficient α and the above-mentioned pressure coefficient β.

Therefore, a mass flow meter, to which the method for measuring a mass flow rate according to the present embodiment is applied, comprises;
 a temperature sensor configured to detect temperature T of said fluid,
 a pressure sensor configured to detect pressure P of said fluid, and
 a correction means configured to calculate a corrected mass flow rate $F_c$ by correcting said actual measured mass flow rate $F_m$ based on said temperature T and said pressure P.

The above-mentioned temperature sensor is not limited particularly, as long as it is possible to detect temperature T of a fluid which flows through the passage. As an example of the above-mentioned temperature sensor, a thermocouple type temperature sensor and a thermistor type temperature sensor, etc. can be mentioned, for example. The above-mentioned pressure sensor is not limited particularly, as long as it is possible to detect pressure P of a fluid which flows through the passage. As an example of the above-mentioned pressure sensor, an electric-capacity type pressure sensor and a gauge type pressure sensor, etc. can be mentioned, for example. In addition, in the thermal type mass flow controller shown in FIG. 1, both the temperature sensor 131 and the pressure sensor 132 are disposed on the upstream side from a branching point where the sensor tube 116 of the passage 114 branches. However, position and fashion in which the temperature sensor and pressure sensor are disposed in the thermal type mass flow meter according to the present embodiment are not limited particularly, as long as it is possible to detect temperature T and pressure P of the fluid which flows through the passage.

The above-mentioned correction means calculates the corrected mass flow rate $F_c$ by correcting the actual measured mass flow rate $F_m$ based on the temperature T detected by the above-mentioned temperature sensor and the pressure P detected by the above-mentioned pressure sensor. Such an arithmetic processing can be performed by an electronic control unit, such as a microcomputer built in a thermal type mass flow meter, for example. In addition, in the thermal type mass flow meter 110 shown in FIG. 1 mentioned above, the above-mentioned correction means is included in the control means 130.

As mentioned above, in accordance with a method for measuring a mass flow rate according to a conventional technology, since influence by either one of temperature or pressure of a fluid whose mass flow rate is to be measured is taken into consideration, there was a possibility that measurement accuracy of a mass flow rate might become insufficient. In addition, since it is necessary to previously define a correction coefficient for each of huge number of combinations of kinds, temperatures and pressures of fluid, there was a possibility that it might be necessary to enlarge capacity (data storage capacity) of a data storage device which stores data relevant to these huge numbers of correction coefficients and/or a calculation load when an actual value of a mass flow rate is corrected using these correction coefficients might be increased.

On the contrary to the above, in a method for measuring a mass flow rate according to the present embodiment, change rates of a mass flow rate with respect to temperature and pressure (a temperature coefficient and a pressure coefficient) of a fluid whose mass flow rate is to be measured are previously acquired, and a mass flow rate is calculated according to a formula which uses deviations of temperature and pressure between the times of measurement and calibration, the temperature coefficient and the pressure coefficient.

Specifically, a data storage device, which said correction means comprises, is configured to previously store;

a temperature coefficient $\alpha$ which is a partial differential coefficient of said actual measured mass flow rate $F_m$ of said fluid with respect to temperature, and a pressure coefficient $\beta$ which is a partial differential coefficient of said actual measured mass flow rate $F_m$ of said fluid with respect to pressure.

The above-mentioned temperature coefficient $\alpha$ can be determined by acquiring a change rate ($\partial F_m/\partial T$) with respective to the temperature T of the actual measured mass flow rate $F_m$ measured by the thermal type mass flow meter when changing the temperature T of a fluid as a target while maintaining the pressure P of the fluid constant in a state where the fluid is flowed through the thermal type mass flow meter at a constant flow rate, for example. Alternatively, the temperature coefficient $\alpha$ may be determined by acquiring a change rate ($\partial F_m/\partial T$) with respective to the temperature T of the actual measured mass flow rate $F_m$ as mentioned above at each of a plurality of different pressures Ps and averaging a plurality of change rates ($\partial F_m/\partial T$) thus acquired.

The above-mentioned pressure coefficient $\beta$ can be determined by acquiring a change rate ($\partial F_m/\partial P$) with respective to the pressure P of the actual measured mass flow rate $F_m$ measured by the thermal type mass flow meter when changing the pressure P of a fluid as a target while maintaining the temperature T of the fluid constant in a state where the fluid is flowed through the thermal type mass flow meter at a constant flow rate, for example. Alternatively, the pressure coefficient $\beta$ may be determined by acquiring a change rate ($\partial F_m/\partial P$) with respective to the pressure P of the actual measured mass flow rate $F_m$ as mentioned above at each of a plurality of different temperatures Ts and averaging a plurality of change rates ($\partial F_m/\partial P$) thus acquired.

The temperature coefficient $\alpha$ and pressure coefficient $\beta$ determined as mentioned above are stored in a data storage device (for example, non-volatile memory, etc.) which the above-mentioned correction means comprises, etc. Thereby, when actually measuring a mass flow rate of the target fluid, the temperature coefficient $\alpha$ and pressure coefficient $\beta$ stored in the data storage device can be referred to (read out) to be used for calculation of a more accurate mass flow rate corrected with these coefficients.

In addition, the "data storage device which the correction means comprises" may be a data storage device physically contained in an electronic control unit which constitutes the correction means, or may be a data storage device which is not physically contained in the electronic control unit which constitutes the correction means. In the latter case, the "data storage device which the correction means comprises" may be physically contained in an electronic control unit other than an electronic control which constitutes the correction means, or may be a data storage device which is independently disposed outside the electronic control unit which constitutes the correction means.

Moreover, when it is assumed that mass flow rates of a plurality of kinds of fluids are measured by the thermal type mass flow meter, the temperature coefficient $\alpha$ and the pressure coefficient $\beta$ corresponding to the respective of the plurality of kinds of fluids can be stored in a data storage device, and the temperature coefficient $\alpha$ and the pressure coefficient $\beta$ corresponding to a fluid whose mass flow rate is to be measured can be read out from the data storage device to be used for calculation of a more accurate mass flow rate corrected with these coefficients.

Specifically, said correction means is configured to calculate said corrected mass flow rate $F_c$ by correcting said actual measured mass flow rate $F_m$ according to the following formula (4), based on a temperature deviation $\Delta T$ ($=T-T_0$) which is a deviation between temperature $T_0$ at the time of calibration of the mass flow meter and said temperature T, a pressure deviation $\Delta P$ ($=P-P_0$) which is a deviation between pressure $P_0$ at the time of calibration of the mass flow meter and said pressure P, said temperature coefficient $\alpha$ and said pressure coefficient $\beta$.

$$F_c = F_m(1+\alpha \times \Delta T + \beta \times \Delta P) \qquad (4),$$

In the above formula, the actual measured mass flow rate $F_m$ can be calculated, according to any of the above-mentioned formulae (1) and (2), based on an intensity (actual measured signal intensity) S of an output signal which is actually measured when the fluid is flowed through the thermal type mass flow meter or a proportion ($S/S_0$) of an actual measured signal voltage S to a reference signal voltage $S_0$, for example. Moreover, when a fluid whose mass flow rate is to be measured is a fluid of a different kind from that of a reference fluid, the actual measured mass flow rate $F_m$ can be calculated according to the above-mentioned formula (3).

Thus, in the method for measuring a mass flow rate according to the present embodiment, the temperature coefficient $\alpha$ and pressure coefficient $\beta$ are previously determined for every fluid whose mass flow rate is to be measured, and they are substituted into the above-mentioned formula (4), along with the temperature deviation $\Delta T$ and pressure deviation $\Delta P$ of the fluid between the time of an actual measurement of a mass flow rate and the time of calibration of the thermal type mass flow meter to correct the actual measured mass flow rate Fm. Thereby, a more accurate corrected mass flow rate Fccan be calculated simply.

As a result, in accordance with the method for measuring a mass flow rate according to the present embodiment, an accurate mass flow rate can be measured according to all the kinds, temperatures and pressures of a fluid, without being accompanied by a large increase in data storage capacity and/or a calculation load in a mass flow meter as in the case of a method for measuring a mass flow rate according to a conventional technology.

By the way, the temperature coefficient $\alpha$ is a partial differential coefficient of the actual measured mass flow rate $F_m$ with respect to temperature, and the pressure coefficient $\beta$ is a partial differential coefficient of the actual measured mass flow rate $F_m$ with respect to pressure. Thereby, in the method for measuring a mass flow rate according to the present embodiment, a more accurate corrected mass flow rate $F_c$ can be calculated by correcting the actual measured mass flow rate $F_m$ according to the change of temperature and/or pressure from the temperature $T_0$ and/or the pressure $P_0$ at the time of calibration of the thermal type mass flow meter.

However, among various fluids, there exists not a small number of fluids whose temperature coefficient $\alpha$ is not constant and changes according to change of pressure of the fluid. Moreover, there also exists not a small number of fluids whose pressure coefficient $\beta$ is not constant and changes according to change of temperature of the fluid. As for such fluids, especially when deviation between the pressure at the time of determination of the temperature coefficient $\alpha$ and the pressure at the time of actual measurement of a mass flow rate and/or deviation between the temperature at the time of determination of the pressure coefficient $\beta$ and the temperature at the time of actual measurement of a mass flow rate are large, there is a concern that the accuracy of the corrected mass flow rate $F_c$ calculated according to the above-mentioned formula (4) may fall.

In a case as mentioned above, a more accurate corrected mass flow rate $F_c$ can be calculated by taking into consideration a change rate $(\partial \alpha/\partial P)$ of the temperature coefficient $\alpha$ with respect to the pressure P and/or a change rate $(\partial \beta/\partial T)$ of the pressure coefficient $\beta$ with respect to the temperature T when calculating the corrected mass flow rate $F_c$ by correcting the actual measured mass flow rate $F_m$.

Namely, a second embodiment of the present invention is, the method for measuring a mass flow rate (mass flow rate measurement method) according to said first embodiment of the present invention, wherein:

the data storage device, which said correction means comprises, is configured to previously store, in addition to said temperature coefficient $\alpha$ and said pressure coefficient $\beta$;
a pressure coefficient $\alpha'$ which is a partial differential coefficient of said temperature coefficient $\alpha$ with respect to pressure, and
a temperature coefficient $\beta'$ which is a partial differential coefficient of said pressure coefficient $\beta$ with respect to temperature, and
said correction means is configured to calculate said corrected mass flow rate $F_c$ by correcting said actual measured mass flow rate $F_m$ according to the following formula (5), based on said temperature deviation $\Delta T$, said pressure deviation $\Delta P$, said temperature coefficient $\alpha$, said pressure coefficient $\beta$, said pressure coefficient $\alpha'$ and said temperature coefficient $\beta'$.

$$F_c = F_m(1+\alpha \times (1+\alpha' \times \Delta P) \times \Delta T + \beta \times (1+\beta' \times \Delta T) \times \Delta P) \quad (5),$$

The above-mentioned temperature coefficient $\alpha$ can be determined as follows. For example, for each of a plurality of different pressures Ps, in a state where a fluid as a target is flowed through the thermal type mass flow meter at a constant flow rate, the temperature T of the fluid is changed while maintaining the pressure P of the fluid constant, and a change rate $(\partial F_m/\partial T)$ with respect to the temperature T of the actual measured mass flow rate $F_m$ measured by the thermal type mass flow meter at this time. Any of a plurality of the change rates $(\partial F_m/\partial T)$ thus obtained may be the temperature coefficient $\alpha$. Alternatively, or the temperature coefficient $\alpha$ may be determined by averaging the plurality of the change rates $(\partial F_m/\partial T)$ thus obtained.

Furthermore, the above-mentioned pressure coefficient $\alpha'$ can be determined by acquiring a change rate $(\partial \alpha/\partial P)$ of the temperature coefficient $\alpha$ with respect to the pressure P, from a correspondence relation between the change rates $(\partial F_m/\partial T)$ (namely, the temperature coefficient $\alpha$) of the actual measured mass flow rate $F_m$ with respect to the temperature T and the plurality of the corresponding pressures Ps as obtained above.

The above-mentioned pressure coefficient $\beta$ can be determined as follows. For example, for each of a plurality of different temperatures Ts, in a state where a fluid as a target is flowed through the thermal type mass flow meter at a constant flow rate, the pressure P of the fluid is changed while maintaining the temperature T of the fluid constant, and a change rate $(\partial F_m/\partial P)$ with respect to the pressure P of the actual measured mass flow rate $F_m$ measured by the thermal type mass flow meter at this time. Any of a plurality of the change rates $(\partial F_m/\partial P)$ thus obtained may be the pressure coefficient $\beta$. Alternatively, or the pressure coefficient $\beta$ may be determined by averaging the plurality of the change rates $(\partial F_m/\partial P)$ thus obtained.

Furthermore, the above-mentioned pressure coefficient $\beta'$ can be determined by acquiring a change rate $(\partial \beta/\partial T)$ of the pressure coefficient $\beta$ with respect to the temperature T, from a correspondence relation between the change rates $(\partial F_m/\partial P)$ (namely, the pressure coefficient $\beta$) of the actual measured mass flow rate $F_m$ with respect to the pressure P and the plurality of the corresponding temperatures Ts as obtained above.

The temperature coefficient $\alpha$, pressure coefficient $\beta$, pressure coefficient $\alpha'$ and temperature coefficient $\beta'$ determined as mentioned above are stored in a data storage device (for example, non-volatile memory, etc.) which the above-mentioned correction means comprises, etc. Thereby, when actually measuring a mass flow rate of the target fluid, the temperature coefficient $\alpha$, pressure coefficient $\beta$, pressure coefficient $\alpha'$ and temperature coefficient $\beta'$ stored in the data storage device can be referred to (read out) to be used for calculation of a more accurate mass flow rate corrected with these coefficients.

Thus, in the method for measuring a mass flow rate according to the present embodiment, the temperature coefficient $\alpha$, pressure coefficient $\beta$, pressure coefficient $\alpha'$ and temperature coefficient $\beta'$ are previously determined for every fluid whose mass flow rate is to be measured, and they are substituted into the above-mentioned formula (5), along with the temperature deviation $\Delta T$ and pressure deviation $\Delta P$ of the fluid between the time of an actual measurement of a mass flow rate and the time of calibration of the thermal type mass flow meter to correct the actual measured mass flow rate $F_m$. Thereby, a more accurate corrected mass flow rate $F_c$ can be calculated simply.

As a result, in accordance with the method for measuring a mass flow rate according to the present embodiment, also for a fluid whose temperature coefficient $\alpha$ and/or pressure coefficient $\beta$ change according to change of the pressure and/or temperature of the fluid as mentioned above, a much more accurate mass flow rate can be measured according to all the kinds, temperatures and pressures of a fluid, without being accompanied by a large increase in data storage capacity and/or a calculation load in a mass flow meter as in the case of a method for measuring a mass flow rate according to a conventional technology.

By the way, as mentioned at the beginning of the present specification, the present invention relates not only to a method for measuring a mass flow rate, but also to a thermal type mass flow meter which uses the method.

Namely, a third embodiment of the present invention is, a capillary heating type thermal type mass flow meter (capillary heating type thermal mass flow meter) which comprises a flow sensor configured to output an output signal corresponding to a mass flow rate of a fluid, and is configured to measure an actual measured mass flow rate $F_m$ of said fluid based on an actual measured signal intensity S which is an intensity of said output signal, wherein:

said mass flow meter further comprises;
- a temperature sensor configured to detect temperature T of said fluid,
- a pressure sensor configured to detect pressure P of said fluid, and
- a correction means configured to calculate a corrected mass flow rate $F_c$ by correcting said actual measured mass flow rate $F_m$ based on said temperature T and said pressure P,
- a data storage device, which said correction means comprises, is configured to previously store;
    - a temperature coefficient α which is a partial differential coefficient of said actual measured mass flow rate $F_m$ of said fluid with respect to temperature, and
    - a pressure coefficient β which is a partial differential coefficient of said actual measured mass flow rate $F_m$ of said fluid with respect to pressure, and
- said correction means is configured to calculate said corrected mass flow rate $F_c$ by correcting said actual measured mass flow rate $F_m$ according to the following formula (4), based on a temperature deviation ΔT which is a deviation between temperature $T_0$ at the time of calibration of the mass flow meter and said temperature T, a pressure deviation ΔP which is a deviation between pressure $P_0$ at the time of calibration of the mass flow meter and said pressure P, said temperature coefficient α and said pressure coefficient β.

$$F_c = F_m(1 + \alpha \times \Delta T + \beta \times \Delta P) \quad (4),$$

As mentioned above, the thermal type mass flow meter according to the present embodiment is the thermal type mass flow meter, to which the method for measuring a mass flow rate according to the above-mentioned first embodiment of the present invention. Since the configuration of the thermal type mass flow meter, to which the method for measuring a mass flow rate according to the above-mentioned first embodiment of the present invention, has been already mentioned in the explanation of the method for measuring a mass flow rate according to the above-mentioned first embodiment of the present invention, referring to FIG. 1 and FIG. 2, it will be not explained here repeatedly. Moreover, since the method for measuring a mass flow rate according to the above-mentioned first embodiment of the present invention, which is performed in the thermal type mass flow meter according to the present embodiment, has been also already mentioned, details of the method for measuring a mass flow rate according to the above-mentioned first embodiment of the present invention will not be explained here repeatedly.

As apparent from the previous explanation about the method for measuring a mass flow rate according to the above-mentioned first embodiment of the present invention, in the thermal type mass flow meter according to the present embodiment, the temperature coefficient α and pressure coefficient β stored in a data storage device for every fluid whose mass flow rate is to be measured are substituted into the above-mentioned formula (4), along with the temperature deviation ΔT and pressure deviation ΔP of the fluid between the time of an actual measurement of a mass flow rate and the time of calibration of the thermal type mass flow meter, the actual measured mass flow rate $F_m$ is corrected, and a more accurate corrected mass flow rate $F_c$ is calculated simply.

As a result, in accordance with the thermal type mass flow meter according to the present embodiment, an accurate mass flow rate can be measured according to all the kinds, temperatures and pressures of a fluid, without being accompanied by a large increase in data storage capacity and/or a calculation load as in the case of a thermal type mass flow meter according to a conventional technology.

However, as mentioned above, among various fluids, there exists not a small number of fluids whose temperature coefficient α is not constant and changes according to change of pressure of the fluid. Moreover, there also exists not a small number of fluids whose pressure coefficient β is not constant and changes according to change of temperature of the fluid. As for such fluids, especially when deviation between the pressure at the time of determination of the temperature coefficient α and the pressure at the time of actual measurement of a mass flow rate and/or deviation between the temperature at the time of determination of the pressure coefficient β and the temperature at the time of actual measurement of a mass flow rate are large, there is a concern that the accuracy of the corrected mass flow rate $F_c$ calculated according to the above-mentioned formula (4) may fall.

In a case as mentioned above, a more accurate corrected mass flow rate $F_c$ can be calculated by taking into consideration a change rate $(\partial \alpha / \partial P)$ of the temperature coefficient α with respect to the pressure P and/or a change rate $(\partial \beta / \partial T)$ of the pressure coefficient β with respect to the temperature T when calculating the corrected mass flow rate $F_c$ by correcting the actual measured mass flow rate $F_m$. Namely, in accordance with the thermal type mass flow meter, to which the method for measuring a mass flow rate according to the second embodiment of the present invention is applied, also for a fluid whose temperature coefficient α and/or pressure coefficient β change according to change of the pressure and/or temperature of the fluid as mentioned above, a more accurate mass flow rate can be measured.

Therefore, a fourth embodiment of the present invention is, the thermal type mass flow meter (capillary heating type thermal mass flow meter) according the above-mentioned third embodiment of the present invention, wherein:

the data storage device, which said correction means comprises, is configured to previously store, in addition to said temperature coefficient α and said pressure coefficient β;
- a pressure coefficient α' which is a partial differential coefficient of said temperature coefficient α with respect to pressure, and
- a temperature coefficient β' which is a partial differential coefficient of said pressure coefficient β with respect to temperature, and said correction means is configured to calculate said corrected mass flow rate $F_c$ by correcting said actual measured mass flow rate $F_m$ according to the following formula (5), based on said temperature deviation ΔT, said pressure deviation ΔP, said temperature coefficient α, said pressure coefficient β, said pressure coefficient α' and said temperature coefficient β'.

$$F_c = F_m(1 + \alpha \times (1 + \alpha' \times \Delta P) \times \Delta T + \beta \times (1 + \beta' \times \Delta T) \times \Delta P) \quad (5),$$

In accordance with the thermal type mass flow meter according to the present embodiment, also for a fluid whose temperature coefficient α and/or pressure coefficient β change according to change of the pressure and/or temperature of the fluid as mentioned above, a much more accurate mass flow rate can be measured according to all the kinds, temperatures and pressures of a fluid, without being accompanied by a large increase in data storage capacity and/or a calculation load as in the case of a thermal type mass flow meter according to a conventional technology.

By the way, as mentioned at the beginning of the present specification, the present invention relates not only to a method for measuring a mass flow rate in a thermal type mass flow meter and a thermal type mass flow meter which uses the method, but also to a thermal type mass flow controller which uses the thermal type mass flow meter. The thermal type mass flow controller controls a flow rate adjustment means based on a flow rate of a fluid calculated by the thermal type mass flow meter which uses the method for measuring a mass flow rate according to the present invention, and brings the flow rate of the fluid close to a target value.

Namely, a fifth embodiment of the present invention is,
a thermal type mass flow controller (thermal mass flow controller) comprising; the thermal type mass flow meter (capillary heating type thermal mass flow meter) according to the above-mentioned third or fourth embodiment of the present invention,
a flow rate adjustment means configured to adjust a flow rate of the fluid which flows through said passage, and
a control means configured to control said flow rate adjustment means, wherein:
said control means is configured to control said flow rate adjustment means based on the flow rate of said fluid calculated by said thermal type mass flow meter to bring the flow rate of said fluid close to a target value.

As mentioned above, the thermal type mass flow controller according to the present embodiment is a thermal type mass flow controller which comprises the thermal type mass flow meter according to the above-mentioned third or fourth embodiment of the present invention. Therefore, since a basic configuration of a thermal type mass flow meter has been already mentioned in the explanation of the method for measuring a mass flow rate and the thermal type mass flow meter which uses the method according to the above-mentioned first to fourth embodiments of the present invention, referring to FIG. 1 and FIG. 2, the explanation will not be repeated here.

The thermal type mass flow controller according to the present embodiment comprises a flow rate adjustment means configured to adjust a flow rate of a fluid which flows through the above-mentioned passage and a control means configured to control the above-mentioned flow rate adjustment means, other than the thermal type mass flow meter, as mentioned above. The flow rate adjustment means is not limited particularly, as long as it is possible to adjust the flow rate of the fluid which flows through the passage. As a specific example of the flow rate adjustment means, a flow control valve which can change its opening by an actuator can be mentioned, for example. As long as it is possible to control the flow rate adjustment means to increase or decrease the flow rate of the fluid which flows through the passage, the control means is not limited particularly, either. In the example shown in FIG. 1, the thermal type mass flow controller 100 comprises the flow rate adjustment means 120 configured to control the flow rate of the fluid which flows through the passage 114 and the control means 130 configured to control the flow rate adjustment means 120, other than the thermal type mass flow meter 110.

The flow rate adjustment means 120 includes a flow control valve 121, a valve orifice 122, a diaphragm 123, an actuator 124, a valve drive circuit 125 and a power supply that is not shown, etc., as shown in FIG. 1. The control means 130 controls the flow rate adjustment means 120 based on the flow rate of the fluid calculated by the thermal type mass flow meter 110 to bring the flow rate of the fluid close to a target value. More specifically, the control means 130 compares the flow rate of the fluid calculated by the thermal type mass flow meter 110 with the target value, and transmits a control signal corresponding to the result to the valve drive circuit 125.

For example, when a flow rate of a fluid is less than a target value, the control means 130 sends a control signal to the valve drive circuit 125 so that an opening of the flow control valve 121 is increased and the flow rate of the fluid is increased by the actuator 124. On the contrary, when a flow rate of a fluid is more than a target value, the control means 130 sends a control signal to the valve drive circuit 125 so that an opening of the flow control valve 121 is decreased and the flow rate of the fluid is decreased by the actuator 124. In addition, although flow control of a fluid in a feedback mode was explained in the above-mentioned explanation, flow control of a fluid by the thermal type mass flow controller according to the present embodiment is not limited to a feedback mode, and it may be performed in other control modes, such as a feedforward mode, for example.

In addition, in the thermal type mass flow controller 100 according to the embodiment shown in FIG. 1, the correction means was included in the control means 130, as mentioned above. However, both the correction means and the control means may be implemented as one control means in this way, or they may be implemented as respectively individual control devices.

As mentioned above, in accordance with the thermal type mass flow meter which the thermal type mass flow controller according to the present embodiment comprises, an accurate mass flow rate can be measured according to all the kinds, temperatures and pressures of a fluid, without being accompanied by a large increase in data storage capacity and/or a calculation load as in the case of a thermal type mass flow meter according to a conventional technology. As a result, the thermal type mass flow controller according to the present embodiment can more accurately control a mass flow rate, according to all the kinds, temperatures and pressures of a fluid, without being accompanied by a large increase in data storage capacity and/or a calculation load as in the case of a thermal type mass flow controller according to a conventional technology.

As explained so far, in accordance with the present invention, even though temperature and/or pressure of a fluid whose thermal physical properties (for example, heat capacity etc.) changes largely in association with change of its temperature and/or pressure, changes, a mass flow rate of the fluid can be measured accurately. Moreover, in accordance with the present invention, a mass flow rate can be simply corrected only by carrying out an input to the thermal type mass flow controller to specify a kind of a fluid, when the temperature coefficient α and the pressure coefficient β of the fluid are stored in a data storage device which the thermal type mass flow meter comprises. Furthermore, even as for such a fluid that change of the temperature coefficient α by pressure and/or change of the pressure coefficient β by temperature is large enough to affect measurement accuracy of a mass flow rate, a more accurate mass flow rate can be measured by correcting a mass flow rate with a higher accuracy in consideration of the pressure coefficient α' which is a change rate of the temperature coefficient α with respect to pressure and/or the temperature coefficient β' which is a change rate of the pressure coefficient β with respect to temperature. As a result, a more accurate mass flow measurement and mass flow control can be performed also for such a fluid.

Hereafter, configurations of thermal type mass flow meters according to several embodiments of the present invention, etc. will be explained in more detail, sometimes referring to accompanying drawings. However, the explanations described below are only aimed at exemplification, and it should be not interpreted that the scope of the present invention is limited to the following explanations.

EXAMPLE

In the present working example, nitrogen gas ($N_2$) was used as a reference fluid (reference gas), and mass flow rates of various fluids (specifically, gases of oxygen ($O_2$), argon (Ar), perfluorocyclobutane ($C_4F_8$), difluoromethane ($CH_2F_2$), monofluoromethane ($CH_3F$) and nitrous oxide (dinitrogen monoxide) ($N_2O$)) were measured at various temperatures and pressures. Change rates of actual measured values of mass flow rates of these various fluids with respect to temperature and pressure were investigated.

(1) Configuration of Experimental Apparatus

Figure 3:
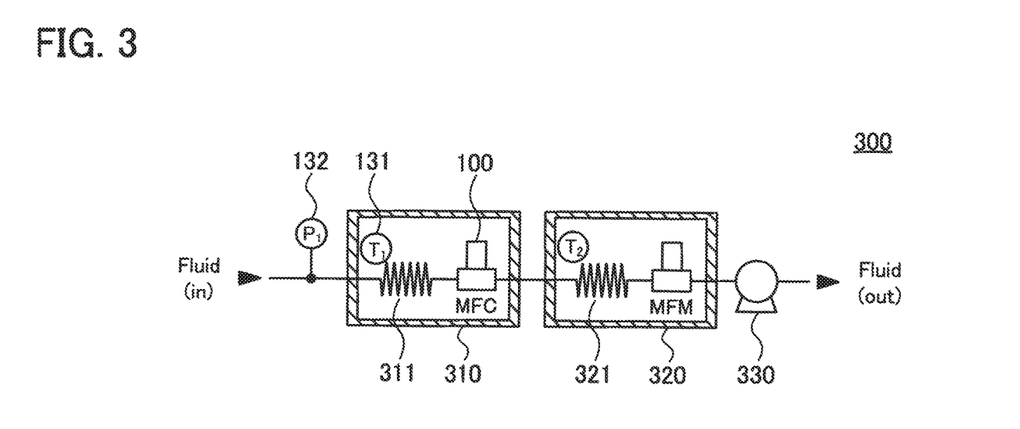
FIG. 3 is a schematic diagram for showing a configuration of an experimental apparatus used for a test for investigating change rates of an actual measured mass flow rate of a fluid with respect to various temperatures and pressures in a working example.

A configuration of an experimental apparatus 300 used for an experiment, in which the change rates of actual measured values of mass flow rates of the various fluids with respect to temperature and pressure were investigated in the present working example, is shown in FIG. 3. As shown in FIG. 3, starting from an upstream side of a passage through which the fluid flows, the thermal type mass flow controller 100 according to the present invention, the thermal type mass flow meter 110 which the thermal type mass flow controller 100 (MFC) comprises, and a thermal type mass flow meter (MFM) which has the same specification as the MFC were disposed, respectively. The configurations of the thermal type mass flow controller 100 according to the present invention and the thermal type mass flow meter 110 which the thermal type mass flow controller 100 (MFC) comprises have been already mentioned above, referring to FIG. 1 and FIG. 2.

In both the thermal type mass flow meter 110, which the MFC comprises, and the MFM, a maximal flow rate (full scale) is 1 slm, and a set flow rate is set to 100% (SP=100%). The MFC and MFM were connected in series by the above-mentioned passage. Moreover, the MFC and MFM were respectively housed in separate constant-temperature ovens (respectively, 310 and 320), along with heat exchangers (respectively, 311 and 321) disposed on their upstream sides respectively. Thereby, temperatures of the fluid which flows through the passages which the MFC and MFM comprise can be matched with temperatures in the respective constant-temperature ovens.

In the present working example, temperature $T_1$ of the MFC was changed variously, while temperature $T_2$ of the MFM was maintained constant (at 22° C.). Also as for the pressure of the fluid, pressure P in the passage on an upstream side of the MFC was changed variously, while pressure in the passage on a downstream side of the flow control valve 121 which the MFC comprises was always held constant at 27 kPa with a vacuum pump 330 disposed on a downstream side of the MFM. In addition, when it was difficult to hold the pressure at 27 kPa only with the vacuum pump 330, the pressure can be controlled more easily by further preparing a pressure reducing valve and/or another valve, etc. in a piping.

As mentioned above, the MFM monitors a result of flow control by the MFC at various temperatures and pressures. When there is no influence on the actual measured value of the mass flow rate by the temperature and/or pressure of the fluid, the actual measured value of the mass flow rate measured by the MFM should be constant at the maximal flow rate (1 slm) at any temperatures and pressures, while there is the influence, the actual measured value of the mass flow rate measured by the MFM should deviate from the maximal flow rate (1 slm).

In addition, in the schematic diagram shown in FIG. 3, the pressure of the fluid in the passage on the upstream side of the MFC is measured on an upstream side of the constant-temperature oven 310 (outside the constant-temperature oven 310). However, as mentioned above, a configuration and a placement of a pressure sensor is not limited in particular, as long as it is possible to detect the pressure P of the fluid which flows through the passage. Furthermore, in the present working example, in order to take into consideration an individual difference of the thermal type mass flow meter 110 (MFC), a first to third thermal type mass flow meters (MFC-1, MFC-2 and MFC-3) were prepared, and an identical experiment was performed for each.

(2) Change of Actual Measured Value of Mass Flow Rate of Reference Fluid in Association with Temperature Change First, in a state where the pressure P1 was held constant at 138 kPa, nitrogen gas ($N_2$) was supplied to the experimental apparatus 300 which has a configuration as mentioned above. Then, the temperature ($T_1$) in the constant-temperature oven 310 was set at three temperatures, 22° C., 32° C. and 42° C., values of proportion f' (%) of actual measured signal voltage S' measured by the MFM when the temperature and flow rate became stable to the reference signal voltage $S_0$ (5.000 V) (hereafter, the symbol "'" means that it is a value based on an actual measured value monitored by the MFM.). The values of the three measured f's plotted to the temperature $T_1$ rode in a straight line, and its gradient was +0.012 (/° C.).

Here, since the value of the f' actually measured by the MFM is a value based on the actual measured value by the MFM on the downstream side where the temperature $T_2$ was held constant at 22° C., the change of the temperature $T_1$ in the constant-temperature oven 310 on the upstream side should not influence this measurement. On the other hand, in the mass flow controller 100 (MFC), the flow control valve 121 is controlled so that the f actually measured by the thermal type mass flow meter 110 approaches (gets closer to) a target value (for example, 100%). Therefore, the fact that the value of the f' actually measured by the MFM changed means that the f which should have been held constant at the target value by the thermal type mass flow meter 110 which the mass flow controller 100 (MFC) comprised changed.

As mentioned above, the change of the f actually measured by the mass flow meter 110, which the mass flow controller 100 (MFC) comprises, due to temperature can be measured indirectly, by actually measuring the mass flow rate of the fluid controlled by the mass flow controller 100 (MFC) using the MFM. Therefore, a partial differential coefficient $\partial f/\partial T$ of the f to the temperature $T_1$ can be acquired indirectly from the above-mentioned gradient of the plots of the value of the f' to the temperature $T_1$. From the gradient of the plots with respect to the temperatures $T_1$s of the values of the three f's measured in a state where the pressure $P_1$ is held constant at 138 kPa as mentioned above, it turns out that the ∂f/∂T in this state is +0.012 (/° C.). In addition, the temperature coefficient α in the present specification (∂$F_m$/∂T) comes to be a value which is obtained by multiplying ∂f/∂T by $F_0$/100.

Next, the ∂f/∂T was −0.012 (/° C.), as a result of performing the same measurement as the above, except that the first mass flow controller (MFC-1) disposed in the constant-temperature oven 310 was replaced with the second mass flow controller (MFC-2) having the same specification as the first mass flow controller (MFC-1). Furthermore, the ∂f/∂T was −0.006 (/° C.), as a result of performing the same measurement as the above, except that the first mass flow controller (MFC-1) was replaced with the third mass flow controller (MFC-3).

By the way, nitrogen gas ($N_2$) is a stable gas currently widely used as a reference fluid (reference gas) for calibration of a flow rate of mass flow meter, and it is known that its thermal physical properties (for example, heat capacity, etc.) hardly changes due to temperature. Therefore, it is presumed that the change of the f observed in the above is not a change resulting from the change of the thermal physical property of nitrogen gas ($N_2$) due to temperature, but a change resulting from the temperature change of the three sorts of the mass flow controllers MFC-1 to MFC-3 themselves. Although a cause of such a temperature change has not yet been figured out completely, it can be considered that temperature characteristics of an electric circuit which constitutes a mass flow controller and thermal expansion of a sensor tube, etc. may be the cause, for example. Furthermore, it can be considered that the MFC-1 to MFC-3 presented different ∂f/∂T respectively since temperature change of a mass flow controller itself has an individual difference.

From the above consideration, when evaluating the change of the f actually measured by the MFC-1 to MFC-3 due to temperature, the above-mentioned changes inherent in the respective MFCs were deducted. Specifically, such a correction may be performed by a hardware, such as adjustment of a resistance value of a resistor prepared in parallel with a bridge circuit, or may be performed by a calculation processing of data on a software.

(3) Change of Actual Measured Value of Mass Flow Rate of Various Fluids Due to Temperature Change Next, the above-mentioned various fluids (various gases) including nitrogen gas ($N_2$) were flowed through the experimental apparatus 300, and the same measurement as the above was performed. Furthermore, the same measurement as the above was performed also in a state where the pressure $P_1$ was held at 207 kPa and 278 kPa. As mentioned above, the fluids (gases) used in the present working example were six kinds of gases of oxygen ($O_2$), argon (Ar), perfluorocyclobutane ($C_4F_8$), difluoromethane ($CH_2F_2$), monofluoromethane ($CH_3F$) and nitrous oxide ($N_2O$). The values of ∂f/∂T measured at respective pressures $P_1$s for these six kinds of gases and nitrogen gas ($N_2$) are listed in the following Table 1.

TABLE 1

| Fluids (gases) | ∂f/∂T [/° C.] | | | ∂f/∂T Average [/° C.] | ∂(∂f/∂T)/∂P [/° C. · kPa] |
|---|---|---|---|---|---|
| | 138 kPa | 207 kPa | 278 kPa | | |
| $N_2$ | 0.000 | 0.000 | 0.000 | 0.000 | 0.000 × 10⁻⁴ |
| $O_2$ | −0.027 | −0.029 | −0.027 | −0.028 | −0.047 × 10⁻⁴ |

TABLE 1-continued

| Fluids (gases) | ∂f/∂T [/° C.] | | | ∂f/∂T Average [/° C.] | ∂(∂f/∂T)/∂P [/° C. · kPa] |
|---|---|---|---|---|---|
| | 138 kPa | 207 kPa | 278 kPa | | |
| Ar | 0.012 | 0.010 | 0.012 | 0.011 | 0.047 × 10⁻⁴ |
| $C_4F_8$ | −0.159 | −0.164 | −0.172 | −0.165 | −0.964 × 10⁻⁴ |
| $CH_2F_2$ | −0.179 | −0.172 | −0.166 | −0.172 | 0.917 × 10⁻⁴ |
| $CH_3F$ | −0.177 | −0.175 | −0.172 | −0.175 | 0.376 × 10⁻⁴ |
| $N_2O$ | −0.099 | −0.097 | −0.095 | −0.097 | 0.259 × 10⁻⁴ |

Respective values listed in Table 1 are mean values (average values) of results obtained in the MFC-1 to MFC-3. In the results, the change rates (∂f/∂T) with respect to the temperature $T_1$ of the f' resulting from the individual difference of MFC-1 to MFC-3 measured at a pressure of 138 kPa using nitrogen gas ($N_2$) as a reference fluid has been deducted. Therefore, ∂f/∂T of nitrogen gas ($N_2$) at a pressure of 138 kPa is 0 (zero). Furthermore, since ∂f/∂T of nitrogen gas ($N_2$) is hardly affected also by change of the pressure $P_1$, ∂f/∂T of nitrogen gas ($N_2$) at pressures of 207 kPa and 278 kPa are also 0 (zero), respectively.

As for oxygen ($O_2$) and argon gas (Ar), an absolute value of ∂f/∂T is small at any pressure $P_1$, and change of ∂f/∂T in association with change of the pressure $P_1$ is also small. Therefore, as for oxygen ($O_2$) and argon gas (Ar), even when a value of ∂f/∂T at either one of the pressure $P_1$s or an average value of ∂f/∂T at three pressure $P_1$s is adopted as ∂f/∂T that is a fixed constant, deviation from ∂f/∂T at respective pressure $P_1$s is small. As a result, even when such a fixed ∂f/∂T (and the corresponding temperature coefficient α) is used, an actual measured mass flow rate $F_m$ can be corrected with a high accuracy, and an accurate corrected mass flow rate $F_c$ can be obtained. Namely, as for such fluids, the actual measured mass flow rate $F_m$ can be corrected with a sufficiently high accuracy and an accurate corrected mass flow rate $F_c$ can be obtained, in accordance with the method for measuring a mass flow rate according to the above-mentioned first embodiment of the present invention (using the above-mentioned formula (4)).

On the other hand, as for perfluorocyclobutane ($C_4F_8$), difluoromethane ($CH_2F_2$), monofluoromethane ($CH_3F$) and nitrous oxide ($N_2O$) which have a comparatively low vapor pressure, an absolute value of ∂f/∂T is large at any pressure $P_1$, and change of ∂f/∂T in association with change of the pressure $P_1$ is also large. Therefore, as for these gases, when a value of ∂f/∂T at either one of the pressure $P_1$s or an average value of ∂f/∂T at three pressure $P_1$s is adopted as ∂f/∂T that is a fixed constant, deviation from ∂f/∂T at respective pressure $P_1$s is large. As a result, when such a fixed ∂f/∂T (and the corresponding temperature coefficient α) is used, it becomes difficult to correct an actual measured mass flow rate $F_m$ with a high accuracy, and it becomes difficult to obtain an accurate corrected mass flow rate $F_c$. However, even as for such fluids, the actual measured mass flow rate $F_m$ can be corrected with a sufficiently high accuracy and an accurate corrected mass flow rate $F_c$ can be obtained, in accordance with the method for measuring a mass flow rate according to the above-mentioned second embodiment of the present invention (using the above-mentioned formula (5)).

Then, a partial differential coefficient ∂(∂f/∂T)/∂P of ∂f/∂T with respect to the pressure $P_1$ was calculated from a gradient of plots of values of ∂f/∂Ts at respective pressure $P_1$s (138 kPa, 207 kPa and 278 kPa) to the pressure $P_1$. The ∂(∂f/∂T)/∂Ps calculated for the respective fluids are listed in a column at the right end of Table 1. The pressure coefficient $\alpha'$ in the present specification is a value which is obtained by multiplying $\partial(\partial f/\partial T)/\partial P$ by $F_0/100$. By correcting the actual measured mass flow rate $F_m$ using the temperature coefficient $\alpha$ and the pressure coefficient $\alpha'$ in combination like the formula (5) mentioned above, a mass flow rate can be corrected with a higher accuracy, not only in consideration of the change rate $(\partial F_m/\partial T)$ of the actual measured mass flow rate $F_m$ with respect to the temperature $T_1$, but also in consideration of the change rate $(\partial \alpha/\partial P)$ of the temperature coefficient $\alpha$ with respect to the pressure $P_1$.

(4) Change of Actual Measured Value of Mass Flow Rate of Reference Fluid Due to Pressure Change Next, an experimental result on a change rate of an actual measured value of a mass flow rate of a reference fluid with respect to pressure change will be explained. First, in a state where the temperature $T_1$ is held constant at 22° C., nitrogen gas ($N_2$) was supplied to the experimental apparatus 300. Then, the pressure ($P_1$) of the fluid on the upstream side from the flow control valve of the MFC is set to three pressures of 138 kPa, 207 kPa and 278 kPa, and a value of proportion f' (%) of the actual measured signal voltage S' measured by the MFM to the reference signal voltage $S_0$ (5.000 V) when the pressure and the flow rate became stable was measured for each pressure. The values of the three measured f's plotted to the pressure $P_1$ rode in a straight line, and its gradient was −0.0018 (/kPa). A partial differential coefficient $\partial f/\partial P$ of the f to the pressure $P_1$ can be acquired indirectly from thus-obtained gradient of the plots of the value of the f' to the pressure $P_1$. Therefore, from the gradient of the plots with respect to the pressures $P_1$s of the values of the three f's measured in a state where the temperature $T_1$ is held constant at 22° C. as mentioned above, it turns out that the $\partial f/\partial P$ in this state is −0.018 (/kPa). In addition, the pressure coefficient $\beta$ in the present specification $(\partial F_m/\partial P)$ comes to be a value which is obtained by multiplying $\partial f/\partial P$ by $F_0/100$.

Next, the $\partial f/\partial P$ was −0.0021 (/kPa), as a result of performing the same measurement as the above, except that the first mass flow controller (MFC-1) disposed in the constant-temperature oven 310 was replaced with the second mass flow controller (MFC-2) having the same specification as the first mass flow controller (MFC-1). Furthermore, the ∂f/∂T was −0.0020 (/kPa), as a result of performing the same measurement as the above, except that the first mass flow controller (MFC-1) was replaced with the third mass flow controller (MFC-3). It is presumed that the difference in $\partial f/\partial P$ among such MFC-1 to MFC-3 is not a change resulting from the change of the thermal physical property of nitrogen gas ($N_2$) due to temperature, but a change resulting from change of pressure applied to the mass flow controllers MFC-1 to MFC-3. Although a cause of such a pressure change has not yet been figured out completely, it can be considered that volume change of the sensor tube, etc. may be the cause, for example. Furthermore, it can be considered that the MFC-1 to MFC-3 presented different $\partial f/\partial P$ respectively since the change of the pressure applied to the mass flow controller has an individual difference.

(5) Change of Actual Measured Value of Mass Flow Rate of Various Fluids Due to Temperature Change Next, the above-mentioned various fluids (various gases) including nitrogen gas ($N_2$) were flowed through the experimental apparatus 300, and the same measurement as the above was performed. Furthermore, the same measurement as the above was performed also in a state where the temperature $T_1$ was held at 32° C. and 42° C. As mentioned above, the fluids (gases) used in the present working example were six kinds of gases of oxygen ($O_2$), argon (Ar), perfluorocyclobutane ($C_4F_8$), difluoromethane ($CH_2F_2$), monofluoromethane ($CH_3F$) and nitrous oxide ($N_2O$). The values of $\partial f/\partial P$ measured at respective temperatures $T_1$s for these six kinds of gases and nitrogen gas ($N_2$) are listed in the following Table 2.

TABLE 2

| Fluids (gases) | $\partial f/\partial P$ [/kPa] | | | $\partial f/\partial P$ Average [/kPa] | $\partial(\partial f/\partial P)/\partial T$ [/kPa · ° C.] |
|---|---|---|---|---|---|
| | 22° C. | 32° C. | 42° C. | | |
| $N_2$ | −0.00198 | −0.00179 | −0.00188 | −0.00188 | $0.047 \times 10^{-4}$ |
| $O_2$ | −0.00183 | −0.00202 | −0.00183 | −0.00190 | $0.000 \times 10^{-4}$ |
| Ar | −0.00212 | −0.00212 | −0.00193 | −0.00205 | $0.094 \times 10^{-4}$ |
| $C_4F_8$ | 0.00183 | 0.00066 | 0.00000 | 0.00083 | $-0.917 \times 10^{-4}$ |
| $CH_2F_2$ | −0.00739 | −0.00640 | −0.00546 | −0.00641 | $0.964 \times 10^{-4}$ |
| $CH_3F$ | −0.00541 | −0.00499 | −0.00456 | −0.00499 | $0.423 \times 10^{-4}$ |
| $N_2O$ | −0.00339 | −0.00306 | −0.00278 | −0.00307 | $0.306 \times 10^{-4}$ |

Respective values listed in Table 2 are mean values (average values) of results obtained in the MFC-1 to MFC-3. As for oxygen ($O_2$) and argon gas (Ar), an absolute value of $\partial f/\partial P$ is small at any temperature $T_1$, and change of $\partial f/\partial P$ in association with change of the temperature $T_1$ is also small. Therefore, as for oxygen ($O_2$) and argon gas (Ar), even when a value of $\partial f/\partial P$ at either one of the temperatures $T_1$s or an average value of $\partial f/\partial P$ at three temperatures $T_1$s is adopted as $\partial f/\partial P$ that is a fixed constant, deviation from $\partial f/\partial P$ at respective temperatures $T_1$s is small. As a result, even when such a fixed $\partial f/\partial P$ (and the corresponding pressure coefficient $\beta$) is used, an actual measured mass flow rate $F_m$ can be corrected with a high accuracy, and an accurate corrected mass flow rate $F_c$ can be obtained. Namely, as for such fluids, the actual measured mass flow rate $F_m$ can be corrected with a sufficiently high accuracy and an accurate corrected mass flow rate $F_c$ can be obtained, in accordance with the method for measuring a mass flow rate according to the above-mentioned first embodiment of the present invention (using the above-mentioned formula (4)).

On the other hand, as for perfluorocyclobutane ($C_4F_8$), difluoromethane ($CH_2F_2$), monofluoromethane ($CH_3F$) and nitrous oxide ($N_2O$) which have a comparatively low vapor pressure, an absolute value of $\partial f/\partial T$ is large at any pressure $P_1$, and change of $\partial f/\partial T$ in association with change of the pressure $P_1$ is also large. Therefore, as for these gases, when a value of $\partial f/\partial T$ at either one of the pressures $P_1$s or an average value of $\partial f/\partial T$ at three pressure $P_1$s is adopted as $\partial f/\partial T$ that is a fixed constant, deviation from $\partial f/\partial T$ at respective pressure $P_1$s is large. As a result, when such a fixed $\partial f/\partial T$ (and the corresponding temperature coefficient $\alpha$) is used, it becomes difficult to correct an actual measured mass flow rate $F_m$ with a high accuracy, and it becomes difficult to obtain an accurate corrected mass flow rate $F_c$. However, even as for such fluids, the actual measured mass flow rate $F_m$ can be corrected with a sufficiently high accuracy and an accurate corrected mass flow rate $F_c$ can be obtained, in accordance with the method for measuring a mass flow rate according to the above-mentioned second embodiment of the present invention (using the above-mentioned formula (5)).

Then, a partial differential coefficient $\partial(\partial f/\partial P)/\partial T$ of $\partial f/\partial P$ with respect to the temperature $T_1$ was calculated from a gradient of plots of values of $\partial f/\partial P$s at respective temperatures $T_1$s (22° C., 32° C. and 42° C.) to the temperature $T_1$. The $\partial(\partial f/\partial P)/\partial T$s calculated for the respective fluids are listed in a column at the right end of Table 2. The temperature coefficient $\beta'$ in the present specification is a value which is obtained by multiplying $\partial(\partial f/\partial P)/\partial T$ by $F_0/100$. By correcting the actual measured mass flow rate $F_m$ using the pressure coefficient $\beta$ and the temperature coefficient $\beta'$ in combination like the formula (5) mentioned above, a mass flow rate can be corrected with a higher accuracy, not only in consideration of the change rate $(\partial F_m/\partial P)$ of the actual measured mass flow rate $F_m$ with respect to the pressure $P_1$, but also in consideration of the change rate $(\partial \beta/\partial P)$ of the pressure coefficient $\beta$ with respect to the temperature $T_1$.

The specific values shown in the present working example as the ranges of temperature and pressure for acquiring the temperature coefficient $\alpha$, the pressure coefficient $\beta$, the pressure coefficient $\alpha'$ (namely, change rate $(\partial \alpha/\partial P)$ of $\alpha$ with respect to the pressure P) and the temperature coefficient $\beta'$ (namely, change rate $(\partial \beta/\partial T)$ of $\beta$ with respect to the temperature T) are nothing more than exemplification. For example, it is needless to say that these coefficients may be acquired, sing actual measured values of mass flow rates in a temperature range and a pressure range other than the temperature range and the pressure range specifically exemplified in the present working example, depending on properties of a fluid whose mass flow rate is to be measured and environmental conditions (for example, temperature and pressure, etc.) in a use for which the fluid is used, etc.

As mentioned above, although some embodiments which have specific configurations have been explained for the purpose of explaining the present invention, the scope of the present invention is not limited to these exemplary embodiments, and modification can be added properly within a limit of matters described in the claims and the specification.

The invention claimed is:

1. A mass flow rate measurement method in a thermal mass flow meter comprising a flow sensor configured to output an output signal corresponding to a mass flow rate of a fluid, the method comprising:
    obtaining an actual measured signal intensity S from an output signal of a flow sensor of the thermal mass flow sensor;
    calculating an actual measured mass flow rate $F_m$ of said fluid based on the actual measured signal intensity S, which is an intensity of said output signal;
    sensing a temperature T of said fluid with a temperature sensor of the thermal mass flow meter;
    detecting a pressure P of said fluid with a pressure sensor of the thermal mass flow meter;
    calculating a corrected mass flow rate $F_c$ by correcting said actual measured mass flow rate $F_m$ based on said temperature T and said pressure P;
    accessing a data storage device on the thermal mass flow meter to obtain:
        a temperature coefficient $\alpha$ which is a partial differential coefficient of said actual measured mass flow rate $F_m$ of said fluid with respect to temperature, and
        a pressure coefficient $\beta$ which is a partial differential coefficient of said actual measured mass flow rate $F_m$ of said fluid with respect to pressure,
        a pressure coefficient $\alpha'$ which is a partial differential coefficient of said temperature coefficient $\alpha$ with respect to pressure, and
        a temperature coefficient $\beta'$ which is a partial differential coefficient of said pressure coefficient $\beta$ with respect to temperature, and
    calculating said corrected mass flow rate $F_c$ by correcting said actual measured mass flow rate $F_m$ according to the following formula:

$$F_c = F_m(1+\alpha \times (1+\alpha' \times \Delta P) \times \Delta T + \beta \times (1+\beta' \times \Delta T) \times \Delta P),$$

based on a temperature deviation $\Delta T$ which is a deviation between temperature $T_0$ at the time of calibration of the mass flow meter and said temperature T, a pressure deviation $\Delta P$ which is a deviation between pressure $P_0$ at the time of calibration of the mass flow meter and said pressure P, said temperature coefficient $\alpha$, said pressure coefficient $\beta$, said pressure coefficient $\alpha'$ and said temperature coefficient $\beta'$; and
providing said corrected mass flow rate $F_c$ as an output of the thermal mass flow meter.

2. A thermal mass flow meter comprising:
    a flow sensor configured to output an output signal corresponding to a mass flow rate of a fluid, and the flow sensor is configured to measure an actual measured mass flow rate $F_m$ of said fluid based on an actual measured signal intensity S, which is an intensity of said output signal;
    a temperature sensor configured to detect a temperature T of said fluid,
    a pressure sensor configured to detect a pressure P of said fluid, and
    a correction means configured to calculate a corrected mass flow rate $F_c$ by correcting said actual measured mass flow rate $F_m$ based on said temperature T and said pressure P, the correction means including:
        a data storage device configured to store:
            a temperature coefficient $\alpha$, which is a partial differential coefficient of said actual measured mass flow rate $F_m$ of said fluid with respect to temperature; and
            a pressure coefficient $\beta$ which is a partial differential coefficient of said actual measured mass flow rate $F_m$ of said fluid with respect to pressure;
            a pressure coefficient $\alpha'$ which is a partial differential coefficient of said temperature coefficient $\alpha$ with respect to pressure, and
            a temperature coefficient $\beta'$ which is a partial differential coefficient of said pressure coefficient $\beta$ with respect to temperature, and
        said correction means is configured to calculate said corrected mass flow rate $F_c$ by correcting said actual measured mass flow rate $F_m$ according to the following formula;

$$F_c = F_m(1+\alpha \times (1+\alpha' \times \Delta P) \times \Delta T + \beta \times (1+\beta' \times \Delta T) \times \Delta P),$$

based on a temperature deviation $\Delta T$ which is a deviation between temperature $T_0$ at the time of calibration of the mass flow meter and said temperature T, a pressure deviation $\Delta P$ which is a deviation between pressure $P_0$ at the time of calibration of the mass flow meter and said pressure P, said temperature coefficient $\alpha$, said pressure coefficient $\beta$, said pressure coefficient $\alpha'$ and said temperature coefficient $\beta'$; and
said correction means is configured to provide said corrected mass flow rate $F_c$ as an output of the thermal mass flow meter.

3. A thermal mass flow controller comprising;
    a flow sensor configured to output an output signal corresponding to a mass flow rate of a fluid through a passage, and the flow sensor is configured to measure an actual measured mass flow rate $F_m$ of said fluid based on an actual measured signal intensity S, which is an intensity of said output signal;
    a temperature sensor configured to detect a temperature T of said fluid,
    a pressure sensor configured to detect a pressure P of said fluid, and a correction means configured to calculate a corrected mass flow rate $F_c$ by correcting said actual measured mass flow rate $F_m$ based on said temperature T and said pressure P, the correction means including:

a data storage device configured to store:
- a temperature coefficient α, which is a partial differential coefficient of said actual measured mass flow rate $F_m$ of said fluid with respect to temperature;
- a pressure coefficient β which is a partial differential coefficient of said actual measured mass flow rate $F_m$ of said fluid with respect to pressure;
- a pressure coefficient α' which is a partial differential coefficient of said temperature coefficient α with respect to pressure, and
- a temperature coefficient β' which is a partial differential coefficient of said pressure coefficient β with respect to temperature, and said correction means is configured to calculate said corrected mass flow rate $F_c$ by correcting said actual measured mass flow rate $F_m$ according to the following formula;

$$F_c = F_m(1+\alpha \times (1+\alpha' \times \Delta P) \times \Delta T + \beta \times (1+\beta' \times \Delta T) \times \Delta P),$$

based on a temperature deviation ΔT which is a deviation between temperature $T_0$ at the time of calibration of the mass flow meter and said temperature T, a pressure deviation ΔP which is a deviation between pressure $P_0$ at the time of calibration of the mass flow meter and said pressure P, said temperature coefficient α, said pressure coefficient β, said pressure coefficient α', and said temperature coefficient β';

a flow rate adjustment means configured to adjust a flow rate of the fluid which flows through said passage, and a control means configured to control said flow rate adjustment means, wherein:

said control means is configured to control said flow rate adjustment means based on the flow rate of said fluid calculated by said thermal type mass flow meter to bring the flow rate of said fluid close to a target value.

* * * * *